United States Patent [19]

Oi

[11] Patent Number: 4,636,871
[45] Date of Patent: Jan. 13, 1987

[54] COPYING MACHINE
[75] Inventor: Takato Oi, Tokyo, Japan
[73] Assignee: Fumiaki Nukada, Japan
[21] Appl. No.: 704,647
[22] Filed: Feb. 22, 1985
[30] Foreign Application Priority Data
  Feb. 22, 1984 [JP] Japan .................................. 59-32148
[51] Int. Cl.⁴ ........................ H04N 1/04; H04N 1/21;
                                    H04N 1/23; G01D 15/16
[52] U.S. Cl. .................................. 358/296; 358/286;
                                                346/139 R
[58] Field of Search ............... 358/296, 285, 286, 293;
                                      346/107 R, 139 R, 1.1

[56]           References Cited
          U.S. PATENT DOCUMENTS
  4,307,406 12/1981 Ruffell ........................ 346/139 R X
  4,348,697  9/1982 Takahashi et al. .................. 358/286
  4,492,966  1/1985 Seki et al. ....................... 358/296 X
  4,496,984  1/1985 Stoffel ........................... 358/296 X Primary Examiner—E. A. Goldberg
Assistant Examiner—Patrick W. Foster
Attorney, Agent, or Firm—McGlew and Tuttle

[57] ABSTRACT

A copying machine in which a reading element array consisting of a plurality of reading elements arranged at equal spacings in a straight line and a printing element array consisting of a plurality of printing elements arranged at equal spacings in a straight line are caused to reciprocate, a relative movement between a subject copy and the reading element array is caused in the direction virtually normal to the reciprocating movement, and a copying paper sheet facing to the printing element array is caused to move is disclosed. The image information read by each reading element is fed to the corresponding printing element to reproduce characters or patterns on the subject copy on the copying paper sheet by means of the printing element array.

2 Claims, 8 Drawing Figures

COPYING MACHINE

BACKGROUND OF THE INVENTION

This invention relates generally to a copying machine for producing a copy of written or drawn material, and more specifically to a copying machine for reading, and printing copies of a subject copy, written or drawn, by dividing the image of the subject copy into a plurality of picture elements.

A typical copying machine for reading and reproducing a two-dimensional image by dividing the image into a plurality of small picture elements, as represented by the facsimile system, usually reads a subject copy 3 by moving a onedimensional image sensor 2 consisting of a linear array of multiple picture element sensors 1, and prints the image thereof on a copying paper sheet 6 while moving a onedimensional printing head 5 consisting of a linear array of multiple dot printing elements 4, as shown in FIG. 1; or reads the subject copy 3 wrapped around a rotating drum 7 by moving a picture element sensor 1, and prints the image thereof on a copying paper sheet 6 wrapped around a rotating drum 8 while moving a dot printing element 4.

Both conventional types of copying machine are based on the same operating principle that a subject copy is divided into small dots, called picture elements, for reading and reproduction. In both types, the smaller the size of picture elements and the more the total number of picture elements, the better becomes the quality of the reproduced picture. As the total number of picture elements is increased, on the other hand, the time for scanning is increased, resulting in the increased time for completing the reproduction of a subject copy.

A copying machine shown in FIG. 1, which is originally suitable for high-speed copying because of the use of onedimensional picture elements, poses no practical problems at least in terms of copying time. To obtain a high-quality reproduction with this type of copying machine, however, a high-resolution one-dimensional image sensor 2 and a one-dimensional printing head capable of high-density printing are required by increasing the number of picture element sensors 1 and dot printing elements 4 per unit length. This, however, may often result in an expensive copying machine.

A copying machine shown in FIG. 2 can yield a high-quality reproduction by reducing the reading area of the picture element sensors 1 and the printing area of the dot printing elements 4 as well as by reducing the travelling speed thereof to increase scanning density. An increase in total number of picture elements, however, leads to an increase in scanning time and therefore the time for completing the reproduction of a subject copy. In addition, the use of a relatively large rotating drum does not necessarily lend itself to reduction in the size of the copying machine.

SUMMARY OF THE INVENTION

It is an object of the present invention to provide a copying machine capable of obtaining a high-quality reproduction without recourse to high-resolution one-dimensional image sensors or one-dimensional printing head capable of high-density printing.

It is another object of the present invention to provide a high-speed, small-sized copying machine requiring no large rotating drum.

It is still another object of the present invention to provide a small-sized copying machine capable of travelling over a subject copy.

The copying machine of the present invention comprises a reading element array for reading a subject copy, consisting of a plurality of reading elements arranged at equal spacings in a straight line, a printing element array for printing a copy of the subject copy on a copying paper sheet based on the image information obtained from the reading elements, consisting of a plurality of printing elements arranged at equal spacings in a straight line in the same direction as the direction of the arrangement of the reading elements, a first means for simultaneously reciprocating the reading element array and the printing element array in the respective arrangement directions thereof, a second means for moving the subject copy with respect to the reading element array in the direction essentially normal to the direction of the reciprocating movement, and a third means for moving the copying paper sheet with respect to the printing element array in the direction essentially normal to the direction of the reciprocating movement.

The present invention is based on the concept that a high-speed, small-sized copying machine capable of obtaining a high-quality reproduction can be constructed by arranging each group of a plurality of reading elements and a plurality of printing elements at equal spacings, and causing both the elements to reciprocate in the direction of arrangement while moving a subject copy and a copying paper sheet in the direction essentially normal to the direction of reciprocating movement to allot the scanning area to each reading element and each printing element.

DESCRIPTION OF THE PREFERRED EMBODIMENT

Figure 1:
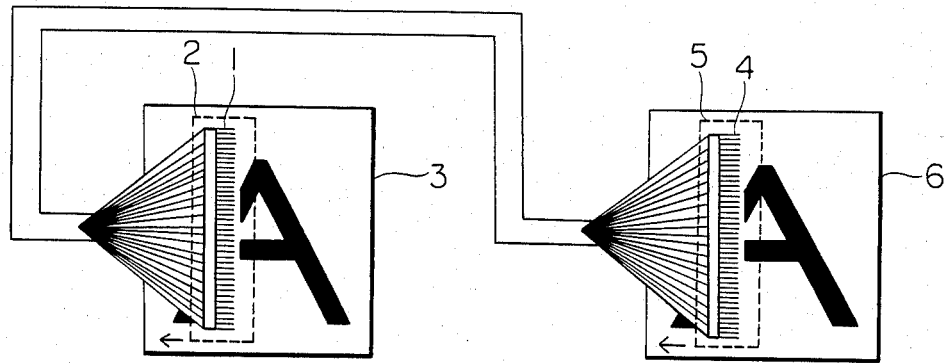
FIGS. 1 and 2 are diagrams of assistance in explaining the scanning system of the conventional type of copying machine.
Figure 2:
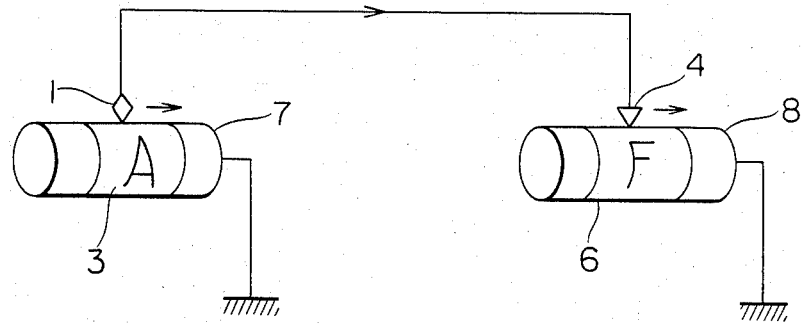
Figure 3:
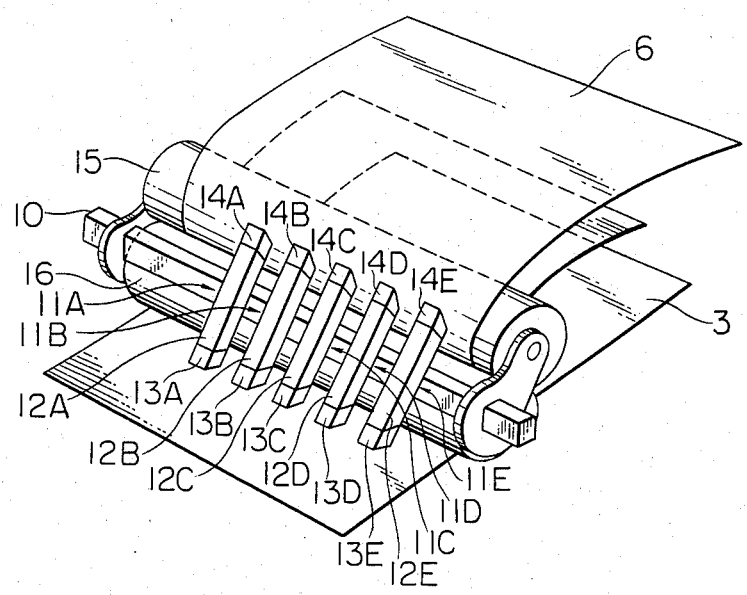
FIG. 3 is a perspective view illustrating the basic construction of an embodiment of the copying machine of the present invention.
Figure 4:
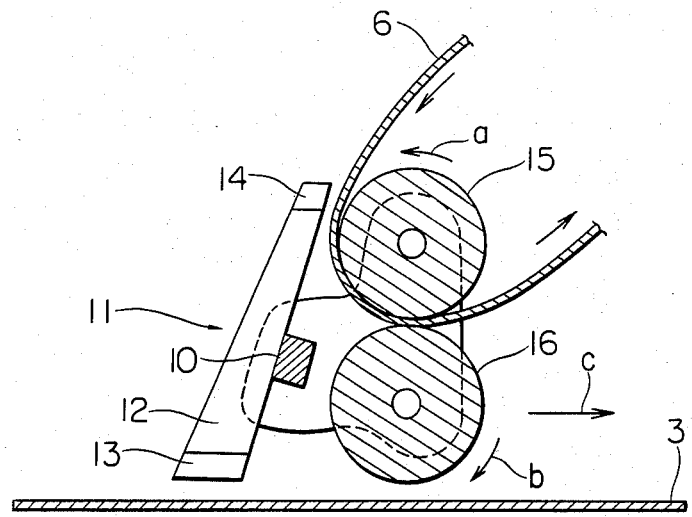
FIG. 4 is a crosssectional view of the copying machine shown in FIG. 3.

FIGS. 3 and 4 are diagrams of assistance in explaining the basic construction of an embodiment of the copying machine of the present invention, FIG. 3 is a perspective view of the copying machine, and FIG. 4 is a crosssectional view of the copying machine.

The copying machine of this embodiment has five reading/printing elements 11A, 11B, 11C, 11D and 11E, fixedly fitted to a slide bar 10 at equal spacings. These reading/printing elements 11A, 11B, 11C, 11D and 11E will be simply called the reading/printing element 11 for simplicity of description unless distinction of individual elements is needed. These reading/printing elements 11A through 11E are composed of connecting portions 12A, 12B, 12C, 12D and 12E, reading elements 13A, 13B, 13C, 13D and 13E, each of which is connected to one end of the corresponding connecting portions 12A through 12E, and printing elements 14A, 14B, 14C, 14D and 14E, each of which is connected to the other end of the corresponding connecting portions 12A through 12E.

As in the case of the reading/printing element 11, these connecting portions 12A through 12E, the reading elements 13A through 13E and the printing elements 14A through 14E will be simply called the connecting portion 12, the reading element 13 and the printing element 14 unless distinction of individual connecting portions, and reading and pringting elements is needed. The reading element 13 may be a photo-diode, photo-transistor, photo-tube or any other type of element that can output a signal for the intensity of light of any one point, that is, any one picture element on an approaching subject copy 3. The printing element 14, on the other hand, may be an ink-jet printer head, a thermal printer head or any other type of element that can print any one point, that is, any one picture element on an approaching copying paper sheet 6, upon receiving a signal from the corresponding reading element 13. This embodiment is constructed so that the output signals of the reading elements 13A through 13E are fed to the corresponding printing elements 14A through 14E.

The copying machine of this embodiment comprises a paper feeding roller 15 having a rotating shaft parallel to a slide bar 10, and a travelling roller 16 having a rotating shaft parallel to the slide bar 10; the paper feeding roller 15 and the travelling roller 16 being pressed onto each other so that the rotation of the paper feeding roller 15 causes the travelling roller 16 to rotate. The paper feeding roller 15 is a roller for feeding a copying paper sheet while forcing the copying paper sheet 6 onto the travelling roller 16, whereas the travelling roller 16 is a roller for moving the copying machine over a stationary subject copy 3. In other words, the copying machine can travel over the subject copy 3 by the aid of the travelling roller 16. The reading element 13 is disposed facing to the subject copy 3, and the printing element 14 is disposed facing to the copying paper sheet 6.

Since FIGS. 3 and 4 are for illustrating the basic construction of this embodiment, a driving means for reciprocating the slide bar 10, a driving means for rotating the paper feeding roller 15 and other members are not shown.

In the copying machine having the aforementioned construction, the slide bar 10 is caused to reciprocate in the longitudinal direction of the slide bar 10, that is, in the direction of the rotating axis of the paper feeding roller 15 and the travelling roller 16. Consequently, the reading/printing element 11, and therefore the reading element 13 and the printing element 14, fixedly fitted to the slide bar are also caused to reciprocate in the same direction. As the paper feeding roller 15 is rotated in the direction shown by an arrow a, the travelling roller is also rotated in the direction shown by an arrow b. As a result, the reading element 13 moves over the subject copy in the direction shown by an arrow c. As the paper feeding roller 15 is rotated, the copying paper sheet 6 is fed, causing a relative movement between the copying paper sheet 6 and the print element 14. Since both the paper feeding roller 15 and the travelling roller 16 are rotated while making contact with each other, the speeds of the movement of the reading element 13 and the relative movement between the copying paper sheet 6 and the printing element 14, both being caused by the rotation of the paper feeding and travelling rollers, become equal to each other. This means that scanning is performed in the same pattern both on the reading and printing sides. Thus, the subject copy 3 is read as the reading element 13 scans thereon, signals in accordance with the intensity of light of detected picture elements are output by the reading element 13 to the printing element 14, which in turn prints the picture elements in accordance with the received signals on the copying paper sheet 6.

Figure 5:
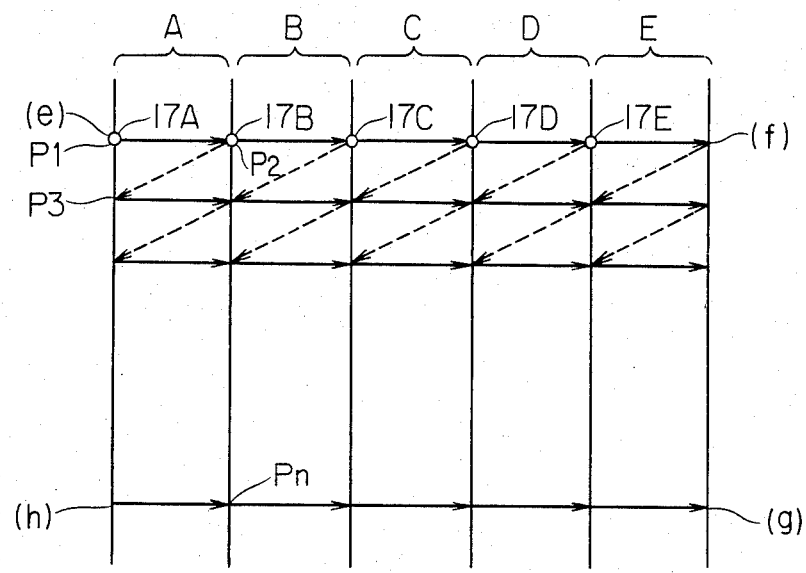
FIG. 5 is a diagram illustrating the scanning pattern on both the reading and printing sides in the embodiment shown in FIGS. 3 and 4.

FIG. 5 is a diagram of assistance in explaining the scanning pattern both on the reading and printing sides.

As noted earlier, the scanning pattern of the reading element 13 with respect to the subject copy 3 is identical to the scanning pattern of the printing element 14 with respect to the copying paper sheet 6. Hereinafter, therefore, the scanning patterns of the reading and printing elements will be simply called the scanning pattern. Furthermore, the reading element 13 and the printing element 14 will be simply called the element 17 for convenience sake unless distinction of both types of elements is needed. Five elements 17A, 17B, 17C, 17D and 17E are disposed parallel to the direction of the rotating shaft of the paper feeding roller 15 or the travelling roller 16 at equal spacings. In FIG. 5, the right-and-left direction is the 10 direction of the rotating shaft of the paper feeding roller 15 or the travelling roller 16. One element 17 is adapted to cover one-fifth of all picture elements on a subject copy 3 or a copying paper sheet 6; regions A, B, C, D and E in FIG. 5 representing one-fifth regions of the subject copy 3 or the copying paper sheet 6. Now, the scanning pattern of an element 17A covering a left-hand region A will be described. As the slide bar 10 is caused to slide, the scanning point of the element 17A starts at a first start point P1 and moves all the way to a first end point P2 to complete the reading of the subject copy 3 and the printing of a copy thereof. When the scanning point of the element 17A reaches the first end point P2, the slide bar 10 begins sliding in the reverse direction to return to the original position, and at the same time, the paper feeding roller 15 and the travelling roller 16 are caused to rotate slightly. Thus, the scanning point is resumed at a second start point P3, as shown by dot-line arrows. During the time the element 17A moves from the first start point P2 to the second start point P3, reading and/or printing operation is interrupted. Subsequently, the same scanning operation is repeated until the scanning of the region A is completed as the scanning point reaches the final n-th end point Pn. For the regions B, C, D and E, the same scanning operations as with the region A are performed simultaneously. With the simultaneous scanning operation by each element, all the picture elements in the regions enclosed by (e), (f), (g) and (h) are scanned.

Figure 6:
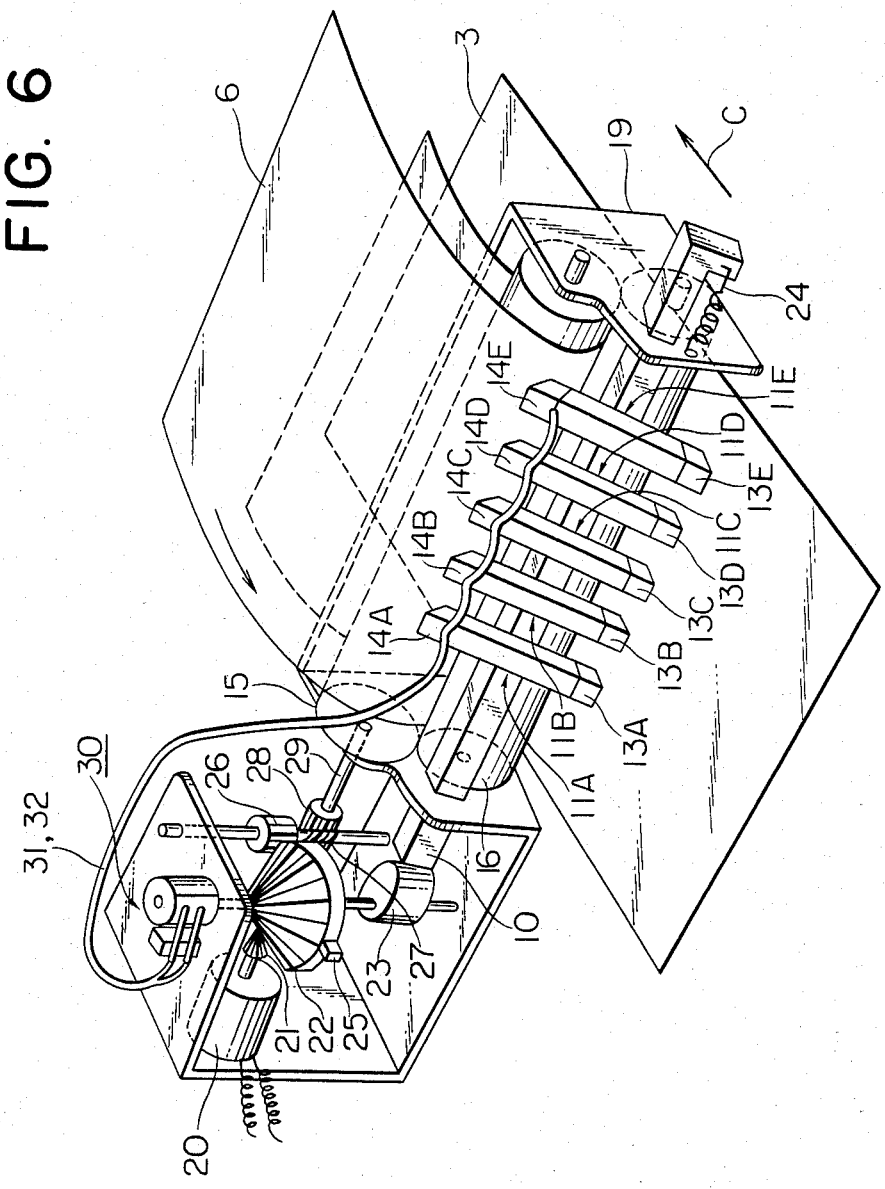
FIG. 6 is a perspective view illustrating a more specific embodiment of the copying machine shown in FIGS. 3 and 4.

FIG. 6 is a perspective view illustrating a more specific embodiment of the copying machine shown in FIGS. 3 and 4. In the figure, like numerals refer to like parts in FIGS. 3 and 4. This copying machine has a motor 20, which is connected to a power source (not shown) via a start switch (not shown). When the start switch is closed, current flows in the motor 20 to start rotation. When the rotation of the motor 20 causes a bevel gear 21 fixedly fitted to the motor shaft to rotate, a bevel gear 22 in mesh with the bevel gear 21 is also caused to rotate. This causes an eccentric cam 23 rotatably fitted to the shaft of the bevel gear 22 to rotate. Along with the rotation of the eccentric cam 23, the slide bar 10 forced onto the eccentric cam 23 by a spring 24, an end of which is fixed to a chassis 19, is caused to reciprocate. The slide bar 10 is slidably supported by the chassis 19. Along with the reciprocating movement of the slide bar 10, the reading/printing element 11 disposed on the slide bar 10 at equal spacings is caused reciprocate with respect to the subject copy 3 and the copying paper sheet 6. On the outer circumferential surface of the bevel gear 22 provided is only one tooth 25, which causes a gear 26 in mesh with the tooth 25 to rotate by one tooth thereof every time the eccentric cam 23 rotates by one turn, that is, every time the slide bar 10 completes one reciprocating movement. The rotation of the gear 26 is transmitted to the rotating shaft 29 of the paper feeding roller 15 via a worm gear 27 fixedly fitted to the shaft of the gear 26 and a gear 28 in mesh with the worm gear 27, thus causing the paper feeding roller 15 to rotate slightly. The rotation of the paper feeding roller 15 causes the copying paper sheet 6 to be fed slightly. And, the travelling roller 16 is also caused to rotate slightly, causing the entire copying machine to slightly move over the subject copy 3 in the direction shown by an arrow C in the figure. In this way, the copying paper sheet 6 is fed in the direction virtually normal to the direction of reciprocating movement of the slide bar 10, while the relative position of the subject copy 3 with respect to the reading element 13 is moved in the direction virtually normal to the direction of reciprocating movement of the slide bar 10.

A switch 30 is connected to the rotating shaft of the eccentric cam 23 and the bevel gear 22; the output lead wires thereof, that is, a common control wire 31 and a common ground wire 32 being connected to the printing element 14.

Figure 7:
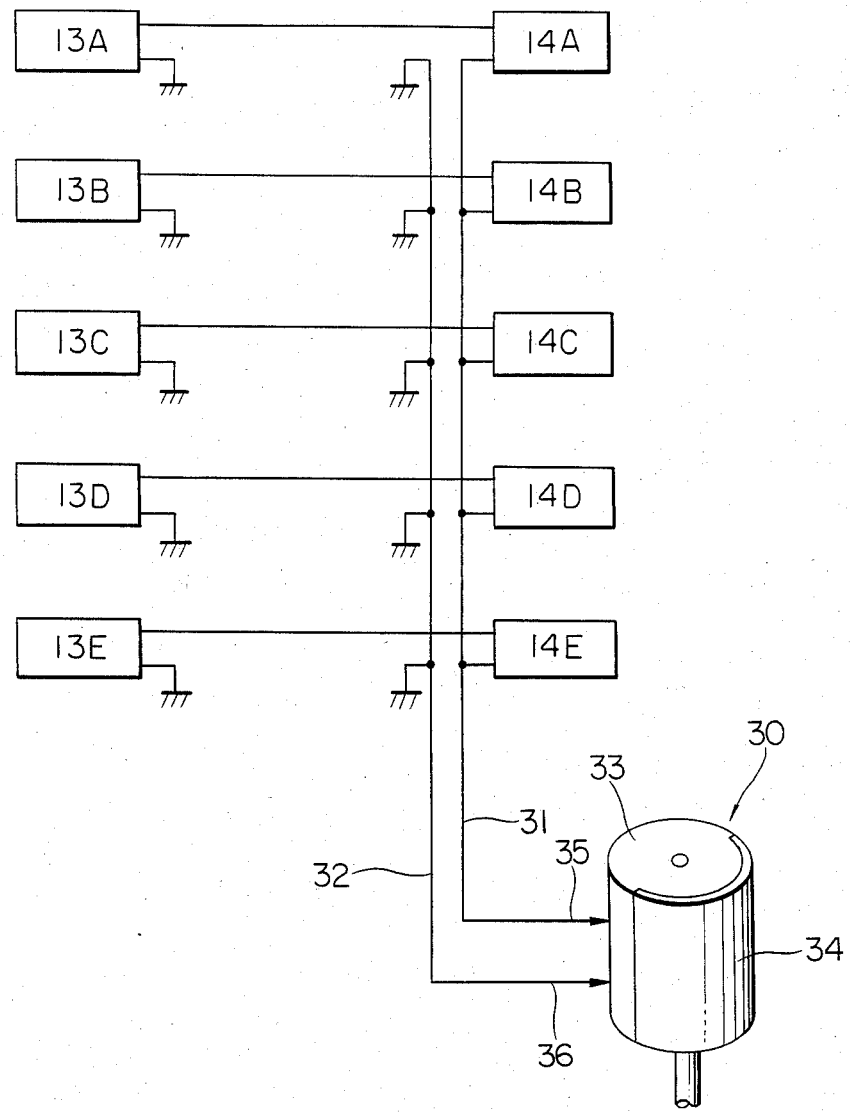
FIG. 7 is a diagram illustrating the connection between the reading elements and the printing elements.

FIG. 7 is a diagram of assistance in explaining the operation of the switch 30, illustrating the connection between the switch 30 and the reading elements 13A through 13E and the printing elements 14A through 14E. The switch 30 has such a construction that a conducting plate 34 is attached to the semi-circumferential surface of a cylinder 33 connected to the rotating shaft of the eccentric cam 23 and the bevel gear 22, and two contacts 35 and 36 are forced onto the side surface of the cylinder 33. As the cylinder 33 rotates, the two contacts 35 and 36 make contact with the conducting plate 34, closing the circuit. The contact 35 is connected to the common control wire 31, and the contact 36 to the common ground wire 32. respectively, thus the switch 30 making and breaking the common control wire 31 and the common ground wire 32. When the switch 30 is closed, the common control wire 31 leading to the printing elements 14A through 14E is grounded, bringing the printing elements 14A through 14E to a state ready for printing in accordance with the outputs from the reading elements 13A through 13E. When the switch 30 is opened, the common control wire 31 remains ungrounded, disabling the printing elements to receive signals from the reading element 13. Thus, printing cannot be performed whether or not signals come from the reading element 13.

Figure 8:
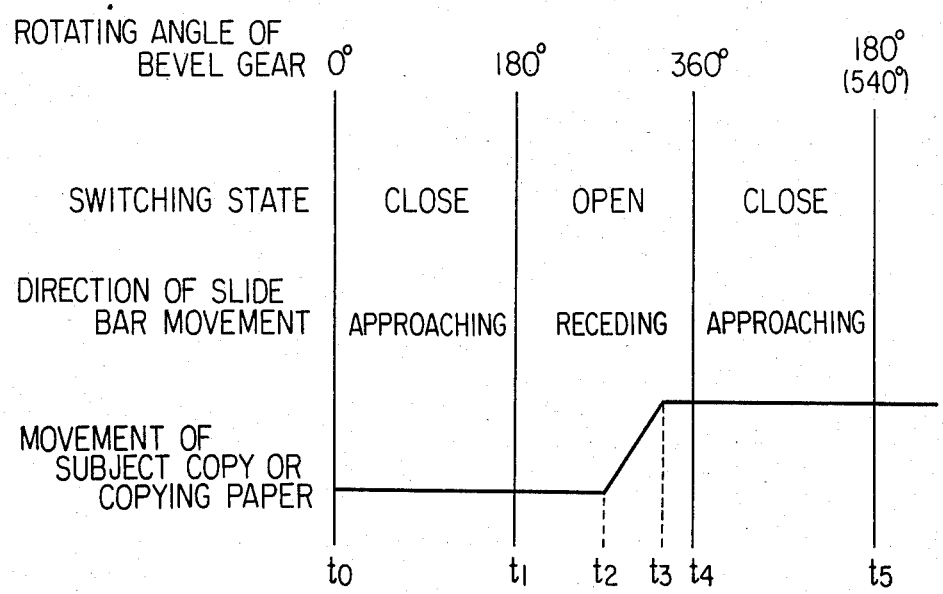
FIG. 8 is a diagram of assistance in explaining the operation of the embodiment shown in FIG. 6.

FIG. 8 is a diagram illustrating the relationship between the rotating angle of the bevel gear 22 and the switch 30 and the open/close state of the switch 30 and the direction of movement of the slide bar 10. Now, the operation of the embodiment shown in FIG. 6 will be described in further detail, referring to this figure.

Assume that the rotating angle of the bevel gear 22 and the switch 30 (hereinafter referred to as the rotating angle of the bevel gear 22) is 0° when the slide bar 10 comes in contact with the crest of the eccentric cam 23, that is, when the slide bar 10 is in the remotest position from the shaft of the eccentric cam 23. Also, assume that the time at which the rotating angle of the bevel gear 22 is 0° is $t_0$. During the period in which the bevel gear 22 rotated by the rotation of the motor 20 remains with a range of rotating angle from 0° to 180°, the switch 30 is kept closed. This causes the slide bar 10 to move in the direction approaching to the shaft of the eccentric cam 23, allowing the reading element 13 to read the picture elements of the subject copy 3. Since the switch is kept closed, signals are fed to the corresponding printing element 14 to print on the copying paper sheet 6. At a time $t_1$, the rotating angle of the bevel gear 22 becomes 180°, bringing the slide bar 10 to a position nearest to the shaft of the eccentric cam 23.

As the time $t_1$ passes, the switch 30 is opened, causing the slide bar 10 to move again in the direction receding from the shaft of the eccentric cam 23. At a time $t_2$, the tooth 25 provided on the outer circumferential surface of the bevel gear 22 becomes engaged with the gear 26, causing the gear 26 to rotate. The rotation of the gear 26 causes the paper feeding roller 15 to rotate via the worm gear 27, the gear 28 and the rotating shaft 29. The rotation of the paper feeding roller 15 also causes the travelling roller 16 forced onto the paper feeding roller 15 to rotate. With the rotation of the paper feeding and travelling rollers 15 and 16, the copying paper sheet 6 is fed, and the copying machine is moved over the subject copy 3 in the direction shown by an arrow c.

At a time $t_3$, the tooth 25 provided on the outer circumferential surface of the bevel gear 22 is disengaged from the gear 26, causing the rotation of the gear 26, the paper feeding roller 15 and the travelling roller 16 to stop.

At a time $t_4$, the rotating angle of the bevel gear 22 becomes 360° or 0°, and thereafter the same operations are repeated to complete copying.

What is claimed is:

1. A copying machine for reading a subject copy by dividing said subject copy into a plurality of picture elements, and at the same time, printing a copy of said subject copy on a copying paper sheet comprising:
   a reading element array consisting of a plurality of reading elements for reading said subject copy, arranged at equal spacings in a straight line,
   a printing element array consisting a plurality of printing elements for printing a copy of said subject copy based on image information from said reading elements, arranged at equal spacings in a straight line in the same direction as the direction of arrangement of said reading elements,
   a first means for reciprocating said reading element array and said printing element array in the direction of arrangement thereof,
   a second means for moving said copying paper sheet in the direction virtually normal to the direction of said reciprocating movement with respect to said printing element array, and a third means for causing the relative movement between said reading element array and said subject copy in the direction virtually normal to the direction of said reciprocating movement, said first means having a slide bar, to which said reading elements and said printing elements are provided in a one-to-one correspondence via a mounting member; said first means having a first driving means for reciprocating said slide means, said second means comprising a paper feeding roller having a rotating shaft parallel to the direction of said reciprocating movement of said reading element array and said printing element array, and a second driving means for rotating said paper feeding roller; said printing element array being disposed in close vicinity to the rotating surface of said paper roller, said third means comprising a travelling roller having a rotating shaft parallel to the direction of said reciprocating movement of said reading element array and said printing element array and being adapted to make contact with said paper feeding roller so as to be caused to rotate by the rotation of said paper feeding roller; said travelling roller being adapted to cause said copying machine to travel over aid subject copy placed on a plane, and said reading element array being disposed in close vicinity to said subject copy, said first driving means having an eccentric cam; a half turn of said eccentric cam causing said slide bar to move in one direction and another half turn of said eccentric cam causing to said slide bar in the direction opposite to said one direction, and that said second driving means causes said paper feeding roller to slightly rotate as said slide bar is moved in said one direction, a gear mechanism connecting said first driving means and said second driving means is provided; said gear mechanism interlocking the rotation of said eccentric cam and the rotation of said paper feeding roller.

2. A copying machine set forth in claim 1 characterized in that a switching means for detecting the rotation of said eccentric cam and for switching over said reading elements or said printing elements so as to bring at least either of said reading elements or said printing elements to a non-operating state.

* * * * *